UNITED STATES PATENT OFFICE.

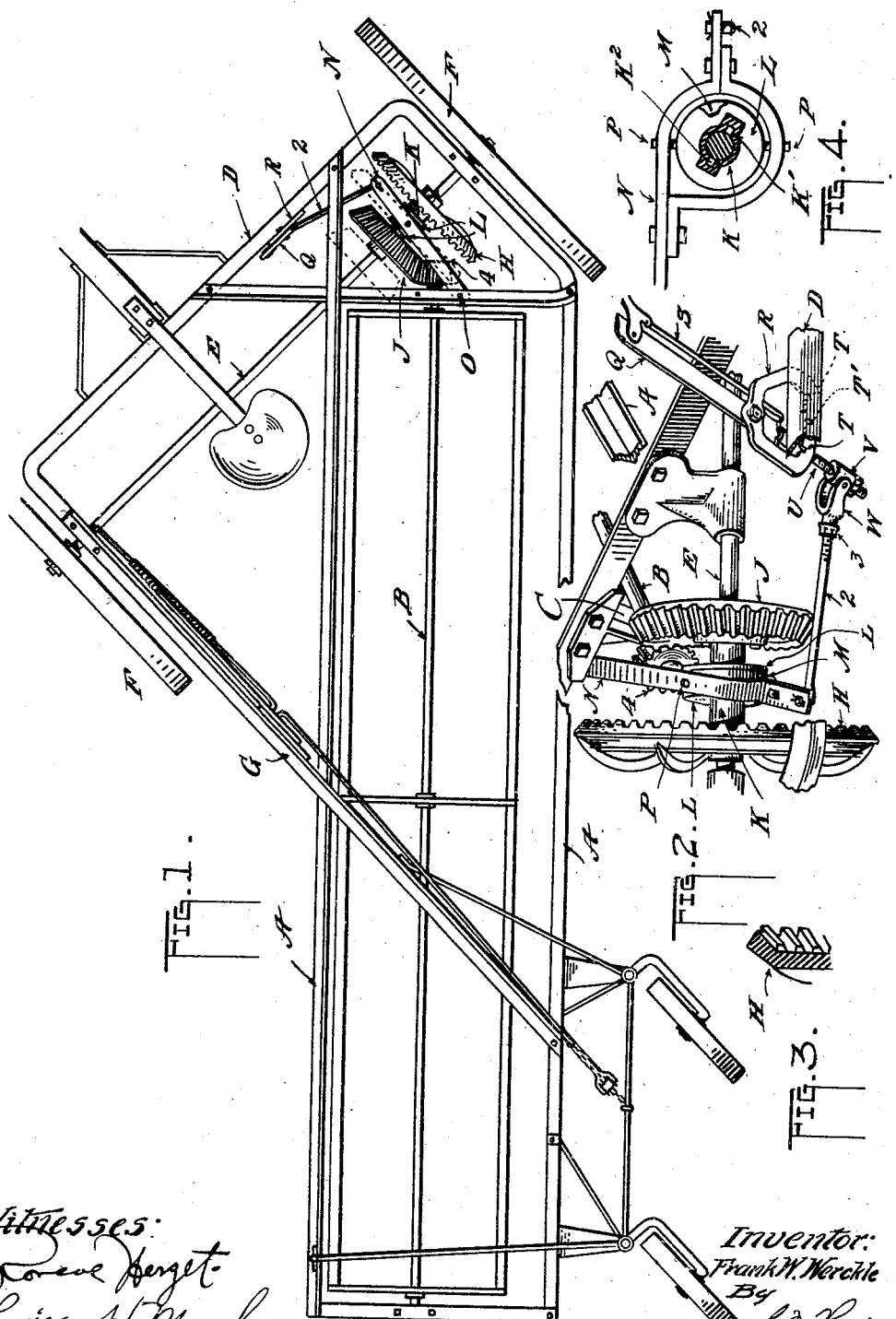

FRANK W. WERCKLE, OF PEORIA, ILLINOIS, ASSIGNOR TO ACME HARVESTING MACHINE CO., OF PEORIA, ILLINOIS, A CORPORATION OF WEST VIRGINIA.

REVERSIBLE GEARING FOR RAKES AND TEDDERS.

1,304,638.　　　　　Specification of Letters Patent.　　Patented May 27, 1919.

Application filed March 17, 1917.　Serial No. 155,442.

*To all whom it may concern:*

Be it known that I, FRANK W. WERCKLE, a citizen of the United States, residing at Peoria, in the county of Peoria and State of Illinois, have invented certain new and useful Improvements in Reversible Gearing for Rakes and Tedders; and I do hereby declare that the following is a full, clear, and exact description of the invention, which will enable others skilled in the art to which it appertains to make and use the same.

This invention relates to improvements in side delivery rakes and tedders. It pertains more particularly to a gearing for adapting the implement for raking or tedding, having certain advantages to be pointed out herein.

The object of the invention, in providing a pair of shiftable gears adapted to engage a pinion of the shaft of the raking cylinder and means to shift the same, is to include parts by which the relation of certain portions of the said shifting means may be changed for taking up wear so as to maintain proper meshing of said gears.

To the end that the invention may be fully understood, I have provided the accompanying drawing which shows one of the embodiments of my invention, it being understood that changes may be made without digressing from the inventive idea.

Figure 1 is a plan of the machine.

Fig. 2 shows, in perspective, a gearing arrangement for adapting the implement for either a rake or a tedder.

Fig. 3 is a section of a portion of one of the gears shown in Fig. 2; and,

Fig. 4 is a detail of part of a gear-shifting lever-arm.

In Fig. 1 only a part of the rake cylinder has been shown, the teeth having been eliminated so as not to complicate the drawing.

A A represents members of the rake frame, and B the shaft of the raking cylinder, only part of which is shown, said shaft being carried in bearings C suspended from said frame, but one of which is shown, see Fig. 2.

D is a frame portion extended from and lying at an angle to the frame portion A and carrying an axle E supported by the usual ground wheels F, the said axle and wheels being fixed relatively.

G is a member connecting the frame A and the frame portion D mentioned, forming a brace for the structure.

H J are two gears preferably mounted upon a sleeve K all in rigid relation and slidably mounted upon the described axle E and arranged to be rotated by the said shaft through the employment of any suitable means to be described.

L L indicate a pair of flanges on the sleeve K, and M is a collar between them within which the sleeve rotates. The sleeve K as shown in Fig. 4 is grooved at K' and a pin K² may extend through the axle and project into the said groove. This is merely one method of driving the sleeve and the gears from the axle, but other means being readily adapted for producing the desired result.

N is a lever-arm pivoted at one end at O to a portion of the frame, see Fig. 1. This incloses said collar M, substantially as shown, and studs P extending from the latter at diametrically opposite sides extend through the said lever-arm.

Q is a lever pivoted upon a suitable bracket R secured to the frame portion D in any suitable manner and S is a latch mechanism carried by the said lever Q adapted for holding the latter in either of two extreme positions by engaging in notches T in said bracket R. The end of the lever Q terminates in a threaded stem U, receiving an internally threaded sleeve V to which a fork W is pivotally secured.

2 is a rod pivotally connected at one end to the free end of the lever-arm N and threaded at its other end to engage in the shank of the said fork W.

3 is a lock-nut on said rod 2 by the use of which the rod and fork after adjustment may be fixed relatively. 4 is a pinion fixed on the described shaft B of the rake cylinder and lying in position to mesh with either of the described gears H, J.

In the relation of the parts shown in Fig. 1 in full lines wherein the gear J engages the pinion 4, the advance movement of the machine will operate the mechanism as a rake, and when in the position shown in dotted lines, or when the gear H is in mesh with said pinion 4, the operation of the shaft B is in the reverse direction, or that for the tedding operation.

A central notch T' in the bracket R receives the latch mechanism S in which position the gears J, H will both be free of the pinion 4 so that the raking cylinder will remain idle during transportation of the machine from place to place.

As the several parts of the shifting mechanism become worn through long use, so that the gears do not properly mesh perhaps, I provide means for taking up lost motion. The lever Q is, therefore, provided with the threaded extension U described so that the sleeve V can be moved farther away from the point of support of said lever and that the lever-arm can be given the required extent of movement.

Most of the wear takes place between the collar M and the flanges L and the various points of connection. Under such circumstances the adjustment of the sleeve V will give added throw as described and having provided for the increased movement, it is necessary to properly adjust the distance between the sleeve V and the point of connection of the rod 2 with the said lever-arm N in order that both of the gears may have the same degree of movement in order that each will properly mesh with the pinion 4. This is done by an adjustment of the rod 2 and the fork W relatively, the lock-nut 3 or equivalent means maintaining those parts in their adjusted positions.

Various structures have been used for changing an implement of this type from a side delivery rake to a tedder and vice versa but they are usually of a complicated nature and cause trouble and annoyance in use besides costing considerable to produce. My device, however, is simple and inexpensive with no complication whatever and is readily and quickly adjusted for taking up wear as explained.

Although I have described and shown only one manner by which the various objects herein are realized it is to be understood that I may make such changes in the parts and arrangement thereof that will be equivalent as would naturally be suggested without departing from the spirit of the invention or departing from the scope of the appended claims.

Having thus described my invention, I claim:

1. In combination, a pair of shafts, a gear fixed to one of them, a pair of gears rotatable with the other adapted to be moved with respect to the first named gear each gear of the pair adapted to separately engage the same, a lever, and means to change the effective throw of the lever whereby the degree of meshing of the gears with the pinion may be varied.

2. In combination, a pair of shafts, a gear fixed to one of them, a pair of gears fixed to the other adapted to be moved with respect to the first named gear, each gear of the pair adapted to separately engage the same, a lever operatively engaging the pair of gears including its latch mechanism, the structure including adjustable mechanism whereby the distance the gears are moved can be altered in a given throw of the lever between its limits of movement.

3. In combination, a pair of power transmitting members, a gear operatively engaging one of the members, a pair of gears operatively engaging the other, either of the pair adapted to mesh with the first named gear, a lever operatively engaging the pair of gears adapted to shift the same relatively to the said first gear, means to secure the lever in either of two extreme positions, and mechanism included in the structure for changing the extent of movement of the pair of gears in a given movement of said lever.

4. In combination, a pair of power transmitting members, a gear operatively engaging one of the members, a pair of gears operatively engaging the other, either of the pair of gears adapted to mesh with the first named gear, a lever operatively engaging the pair of gears adapted to shift the same relatively to the said first gear, means to secure the lever in either of two extreme positions, mechanism included in the structure for changing the extent of movement of the pair of gears in a given movement of said lever, and means to equalize the movement of the two gears of said pair whereby each will mesh to the same extent with said first gear.

5. In combination, a pair of shafts to be driven one from the other, a gear affixed to one of them, a pair of gears fixed on the other, but movable laterally with respect to the first named gear and adapted to separately engage the same, a member operatively engaging the pair of gears, a hand-lever, and mechanism including an adjustable portion connected to and between the said lever and said member adapted for gaging the extent of throw of that end of the lever connected to said member.

6. In combination, a driving shaft and a driven shaft, a gear affixed to one of them, a pair of gears mounted on the other rotatable therewith and movable laterally with respect to and adapted to separately engage the first named gear, a member operatively engaging the pair of gears, a hand-lever, and mechanism connected to and between the said lever and said member including an adjustable part adapted and arranged for changing the distance between the lever and said member.

7. The combination of a driving shaft and a driven shaft, a gear affixed to one of them, a pair of gears mounted on the other rotatable therewith and movable laterally with respect to the first named gear, a member operatively engaging the pair of gears, a hand-lever, and mechanism connected to and between the said lever and said member adapted and arranged for altering the extent of throw of the former at its end connected to said member and for changing the distance between that end of said lever and the member.

8. The combination of a driving shaft and a driven shaft, a pinion gear affixed to the latter, a pair of gears rotatable with the driving shaft and movable in a lateral direction with respect to the said pinion gear, either gear adapted for engaging the latter, a lever-arm operatively engaging the pair of gears, a hand-lever including a latch mechanism, and mechanism connecting the lever and lever-arm adjustable whereby to increase the extent of throw of the former and to alter the distance between the same and the lever-arm.

9. The combination of a driving shaft and a driven shaft, a member affixed to the latter, a pair of members rotatable with the driving shaft and movable along the same adapted to engage and rotate the first said member in either direction, a lever-arm operably engaging said pair of members, a hand-lever operatively connected to the lever-arm, means for changing the extent of throw of that arm of the latter having connection with said lever-arm, and means for varying the distance between the said lever-arm and said lever.

10. The combination of a frame, a driven gear, a pair of driving gears adapted each to engage the driven gear including mechanism operatively engaging the said pair of gears for shifting them relatively to the first said gear, said mechanism including in its construction a lever-arm pivotally supported at one end on the frame, a hand-lever pivoted on the frame, a part adjustable along said hand-lever, and a connection between said part and said lever-arm adjustable for length.

11. The combination of a gear, a pair of gears adapted each to separately engage the same, a lever-arm operatively engaging the pair of gears, a hand-lever, a sleeve carried by the same adjustable longitudinally thereon, and a connection between the lever-arm and the said sleeve pivotally related to each and adapted to be altered in length.

12. The combination of a gear, a pair of gears, means operatively engaging the pair for imparting movement thereto to carry either into engagement with the first named gear, a lever including an adjustable part to which said means is attached adapted for adjustment relatively to said lever whereby the extent of throw of the means and the pair of gears may be controlled.

13. The combination of a gear, a pair of gears, means operatively engaging the pair for imparting movement thereto to carry either into engagement with the first named gear, a lever, a member connecting the means and said lever and adjustable in length whereby the distance between the two may be altered at will.

In testimony whereof I affix my signature in presence of two witnesses.

FRANK W. WERCKLE.

Witnesses:
LOUISE H. MASCH,
L. M. THURLOW.

Copies of this patent may be obtained for five cents each, by addressing the "Commissioner of Patents, Washington, D. C."